United States Patent [19]

McGuire et al.

[11] Patent Number: 4,894,683

[45] Date of Patent: Jan. 16, 1990

[54] VARIABLE BRIGHTNESS LIGHT GENERATORS

[75] Inventors: Kevin P. McGuire, Rochester; James D. McKay, Penfield, both of N.Y.

[73] Assignee: Eastman Kodak Company, Rochester, N.Y.

[21] Appl. No.: 279,623

[22] Filed: Dec. 5, 1988

[51] Int. Cl.[4] ............................................. G03B 27/72
[52] U.S. Cl. ..................................................... 355/71
[58] Field of Search ....................... 355/67, 71, 70, 32, 355/35, 37; 250/229, 578; 354/20

[56] References Cited

U.S. PATENT DOCUMENTS

| | | | |
|---|---|---|---|
| 2,686,452 | 8/1954 | Bentley | 356/408 |
| 3,517,201 | 6/1970 | Gilford et al. | 250/229 |
| 3,684,371 | 8/1972 | Weisglass et al. | 355/71 |
| 4,050,813 | 9/1977 | Pramstraller | 355/67 |
| 4,191,466 | 3/1980 | Gandini | 355/71 X |
| 4,194,834 | 3/1980 | Guillaume | 355/67 |
| 4,236,817 | 12/1980 | Hofstetter | 355/71 X |
| 4,419,008 | 12/1983 | Nishimoto | 355/71 X |
| 4,432,636 | 2/1984 | Tarsia | 355/71 X |
| 4,462,006 | 7/1984 | Fowks | 331/3 |
| 4,491,400 | 1/1985 | Utting | 354/20 |
| 4,519,694 | 5/1985 | Kashiwagi et al. | 355/71 X |
| 4,682,277 | 7/1987 | Yazaki | 355/71 X |

Primary Examiner—Richard A. Wintercorn
Attorney, Agent, or Firm—John B. Turner

[57] ABSTRACT

There is disclosed a variable brightness light generator embodied in apparatus for exposing photographic film for test purposes. The generator includes a spherical mirror, a lamp at the center of the spherical form of the mirror and a modulator located between the lamp and the mirror for modulating the brightness of the image of the lamp created on the lamp by the mirror. The intensity of the light issuing from the lamp is sensed by a spectroradiometer which produces signals used in controlling the modulator whereby the intensity may be kept constant. The color temperature of the lamp is controlled under the influence of signals from the spectroradiometer. The exposing apparatus also includes a plurality of filters selectively insertable in the light path for modifying the intensity and color of the light incident on the film.

7 Claims, 5 Drawing Sheets

VARIABLE BRIGHTNESS LIGHT GENERATORS

CROSS-REFERENCE TO RELATED APPLICATIONS

Reference is made to commonly assigned copending patent applications Ser. No. 279,628, filed simultaneously herewith in the name of Kevin P. McGuire and James D. McKay and entitled CONSTANT COLOR TEMPERATURE AND INTENSITY ILLUMINATION SOURCE; and Ser. No. 279,629, filed simultaneously herewith in the name of Kevin P. McGuire and entitled APPARATUS FOR EXPOSING PHOTOGRAPHIC MATERIALS.

BACKGROUND OF THE INVENTION

1. Field of the Invention

This invention relates to variable brightness light generators.

2. Description Relative to the Prior Art

In the manufacture and use of photographic materials, such as film or paper, it is known, for test purposes, to expose film or paper to a plurality of different intensities and colors of light to determine how it will perform in actual use for taking or making pictures. In copending application Ser. No. 279,629 filed on the same day as the present application and with the title APPARATUS FOR EXPOSING PHOTOGRAPHIC MATERIALS, there is described apparatus for making such exposures of photographic film. That apparatus includes a source of light of constant intensity and color temperature. The present invention provides a variable brightness light generator, the brightness of the output of which can be varied without varying the color temperature of the light.

SUMMARY OF THE INVENTION

According to the present invention there is provided a variable brightness light generator which includes a spherical mirror, a lamp located at the center of the spherical form of the mirror, and a modulator. The modulator, in accordance with the invention, is located between the lamp and the mirror and serves to modulate the brightness of the image of the bulb on the bulb. Such a light generator has the advantage that the color temperature of the light generated is not varied when the intensity is varied and also the uniformity of the light emitted by the generator is not varied when the brightness is varied.

In one embodiment of the invention, the modulator is of the variable aperture type. A particularly simple and satisfactory form of variable aperture modulator is one which includes two shutters movable towards and away from one another. Advantageously, the shutters are formed of the same material as the reflective surface of the mirror, whereby light, whether reflected by the mirror or the shutters has the same spectral composition. The material of the shutters and of the reflective surface of the mirror may be aluminum.

BRIEF DESCRIPTION OF THE DRAWINGS

An embodiment of the present invention will now be described, by way of example, with reference to the accompanying drawings, in which.

DETAILED DESCRIPTION OF THE PREFERRED EMBODIMENT

Reference is made to FIGS. 1 to 5 of the accompanying drawings, which illustrate apparatus 20 for exposing photographic film, embodying a variable brightness light generator in accordance with the present invention.

Figure 1:
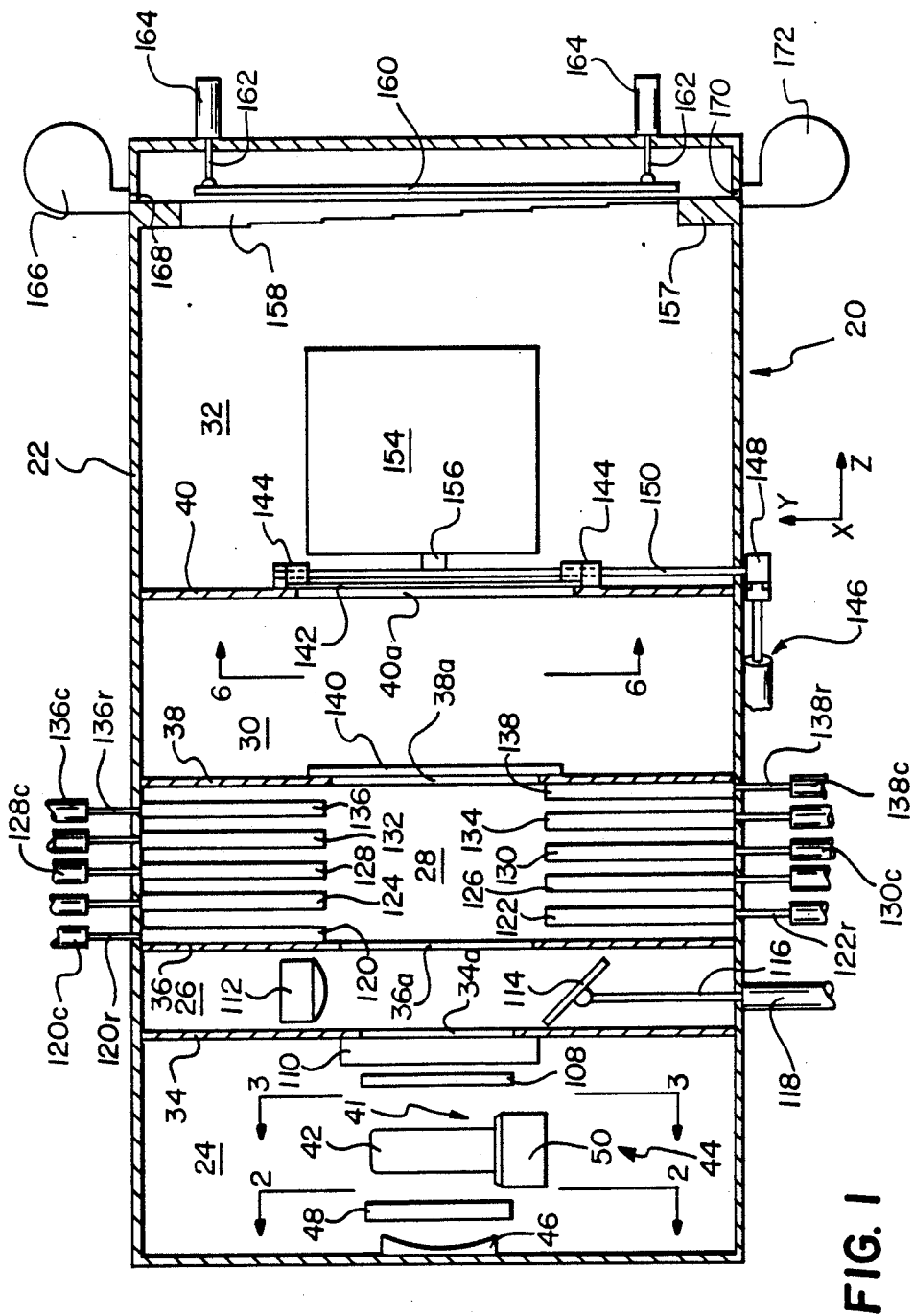
FIG. 1 is a diagrammatic representation of a sectional side elevational view of an apparatus, embodying a variable brightness light generator in accordance with the present invention, for exposing photographic film.

The apparatus 20 includes a generally cuboidal opaque housing 22 which is divided into five compartments 24, 26, 28, 30 and 32 by four baffles 34, 36, 38 and 40. Each baffle 34, 36, 38 and 40 has two apertures 34a, 34c; 36a, 36c; 38a 38c; and 40a, 40c, respectively, to allow light to pass from one compartment to the adjacent compartment. The apertures 34a, 36a, 38a and 40a are rectangular and aligned with one another and the apertures 34c, 36c, 38c and 40c are circular (see FIG. 6) and aligned with one another and behind the apertures 34a, 36a, 38a and 40a as seen in FIG. 1. The baffles 34, 36, 38 and 40 are opaque and join the housing 22 at their outer peripheries so that the only path for light between one compartment and the next is through the apertures 34a, 34c; 36a, 36c; 38a, 36c or 40a, 40c. The baffles and the internal surface of the housing 22 are all painted with a highly light-absorbent black paint, for example, ECP 220 Solar Absorber paint manufactured by 3M.

The compartment 24 houses a variable brightness generator 44, in accordance with the present invention, which forms part of a source of illumination of constant intensity and color tempeature. The generator 44 includes a lamp 41, a mirror 46 and a light modulator 48. Another component of the illumination source is located in the fifth compartment 32, and will be described subsequently herein. The lamp 41 is a tungsten halogen bulb 42 which is mounted in a ceramic bulb holder 50. The power for the bulb 42 is supplied from a power supply 45, shown in FIGS. 7 and 8. The bulb holder 50 is detachably engaged with a socket 52 which is carried on top of a positioning device 54 which, for the sake of clarity, is omitted from FIG. 1 but is shown in detail in FIGS. 3, 4 and 5. The positioning device 54 serves to position the filament of the bulb 42 in five dimensions, namely along the z axis, which is parallel to the plane of FIG. 1, that is, it runs the length of the apparatus illustrated in FIG. 1; along the y axis, which is perpendicular to the z axis but is also in the plane of the paper bearing FIG. 1; along the x axis, which is orthogonal to the z and y axes; angularly about the x axis, which may be termed θx; and angularly about the y axis, which may be termed θy. The x, y and z axes are indicated in FIGS. 1 to 6 to aid understanding.

Positioning along the z axis is achieved by a slideway 56 and a screw 58 working between a part 60 associated with the track 56t of the slideway 56, and a part 62 associated with the carriage 56c of the slideway 56.

Positioning along the x axis is achieved by screws 66 which extend through slots 64, extensive in the x direction, through base 70.

Positioning along the y axis is achieved by shims 68 between the track 56t and the base 70 and between the part 60 and the base 70. The base is fixedly secured to the housing 22 by means not illustrated.

The orientation about the x axis is held, i.e. θx is held, by clamping screws 72. θx is selected, after slackening of the screws 72, by rotation of a pinion 74 secured to shaft 76 rotatably mountedin trunnion 78. The pinion 74 cooperates with a rack 80 to drive the holder 52 in rotary motion about the axis of shaft 76.

Orientation about the y axis is selected by rotation of the socket 52 connected to a sub-base 53 and is held by locking screws, not shown.

An ejector lever 82 is provided to facilitate removal of the lamp 41 from its socket 52.

The mirror 46 is spherical and the filament of the bult 42 is located at the center of the spherical shape of the mirror 46. The mirror 46 is mounted from the housing 22 by means (not shown) which enable the mirror to be selectively positioned along the x and the y axes. The bult 41 is a low-voltage tungsten halogen bult (e.g. a Thorn model L9390 bulb) and has such a small filament that it is only a small approximation to say that the filament is located at the center of the spherical form of the mirror 46. The reflective surface of the mirror 46 is specularly reflective aluminum.

Figure 2:
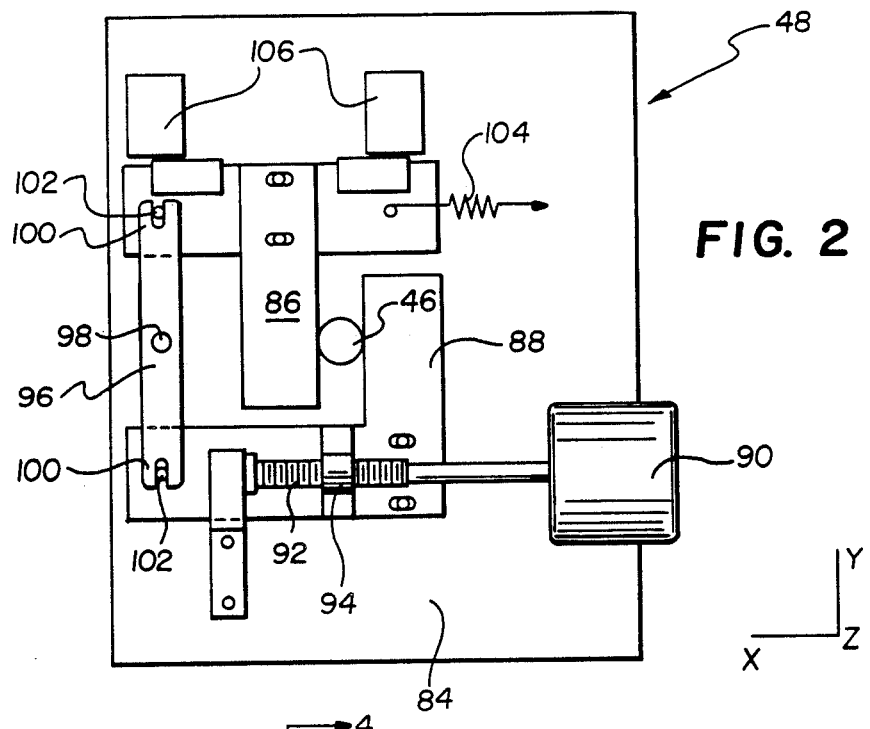
FIG. 2 is a diagrammatic representation of a view taken on the line 2—2 in FIG. 1.
Figure 3:
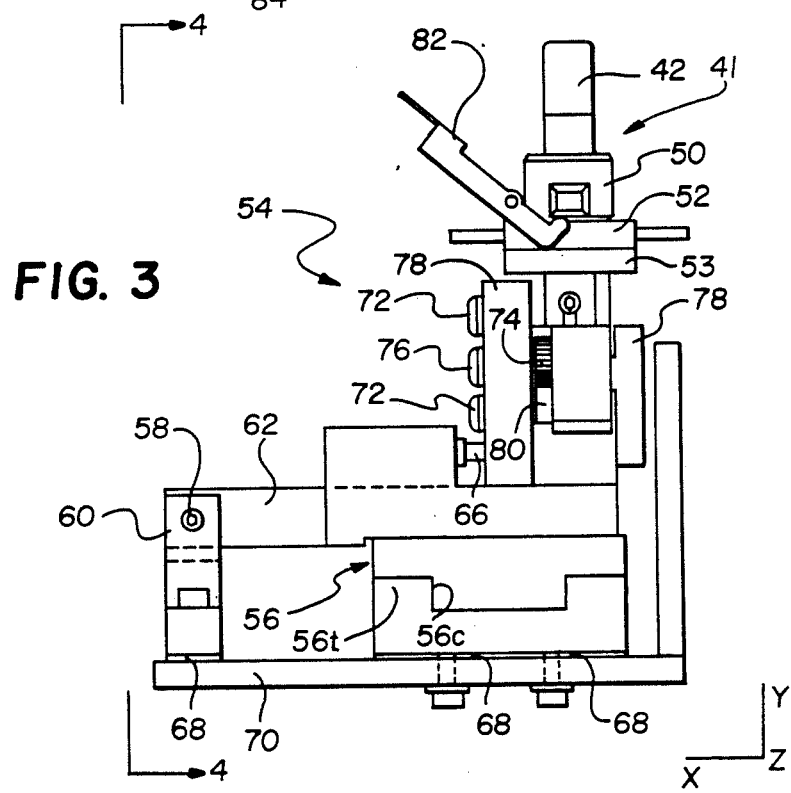
FIG. 3 is a diagrammatic representation of a view in the direction 3—3 in FIG. 1, of a lamp and its supporting structure, included in the apparatus illustrated in FIG. 1.
Figure 4:
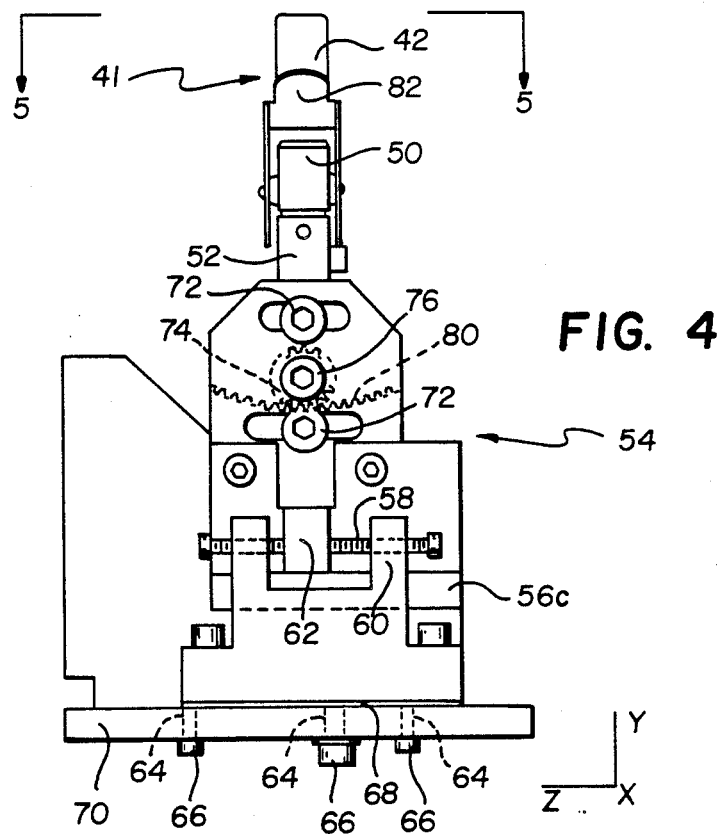
FIG. 4 is a view of the lamp and its supporting structure, as illustrated in FIG. 3, but seen from the direction 4—4 in FIG. 3.
Figure 5:
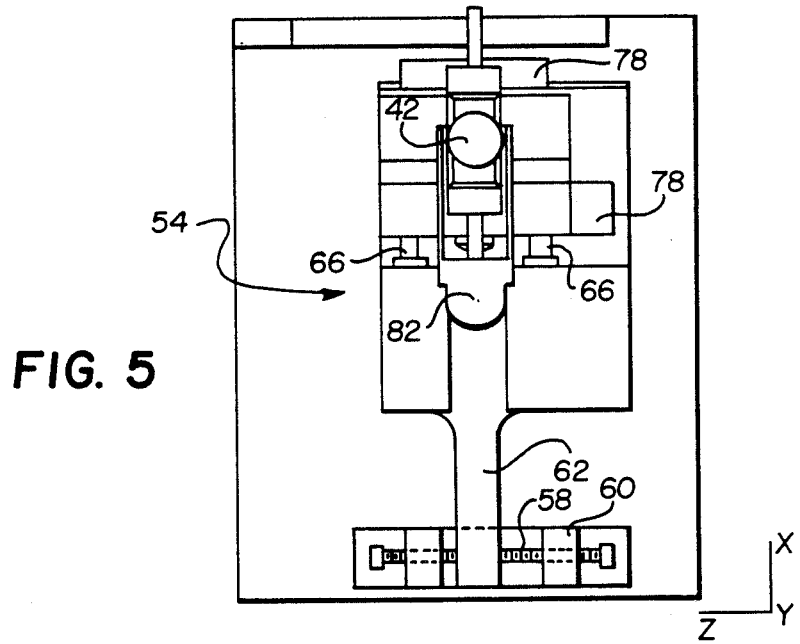
FIG. 5 is a view from above, that is, the direction 5—5 in FIG. 4, of the lamp and its supporting structure illustrated in FIGS. 3 and 4.

The light modulator 48 is diagrammatically represented in FIG. 1 and is represented in more detail in FIG. 2. In the present embodiment, the modulator is of the variable aperture type. The modulator 48 includes a base plate 84 which is attached to the housing 22 and to which the other components of the modulator are directly or indirectly attached. The modulator, in the present embodiment of the invention, is of the sliding shutter type, sometimes termed a sliding barn door type, and includes two shutter blades 86 and 88, respectively, mounted by slideway means, not shown, for guided rectilinear sliding movement relative to the base plate 84, along the x axis. The blades are driven in opposite directions by a stepping motor 90 which drives a screwthreaded shaft 92 cooperating with a nut 94 secured to the blade 88. The motor 90, shaft 92 and nut 94 serve to drive the blade 88 along the x axis, that is, left to right as seen in FIG. 2. Motion is transmitted from the blade 88 to the blade 86 by a lever 96 which is rockable about a pivot 98 at its center. The lever is operatively connected to the blades 86 and 88 by yoke 100 and pin 102 arrangements. The blade 86, like the blade 88, is constrained to move rectilinearly along the x axis by guide means, not shown. To take slack out of the system, there is a spring 104 which biases the blade 86 to the right, as seen in FIG. 2, and, through the lever 96, biases the blade 88 from right to left, as seen in FIG. 2. Sensors 106 sense the positions of the blades 86 and 88, at least when their adjacent edges are close to one another, in order to provide signals which serve to prevent the motor driving the blades closer to one another. In this way, contact, and possible consequential damage, of the edges of the blades may be prevented.

The blades are formed of the same material as the reflecting surface of the mirror 46, which material, in the present embodiment, is aluminum. The surface of the mirror is specularly reflective and the blades have been bead blasted which renders them diffusely reflective. By having the blades and the reflective surface of the mirror made of the same material, light reflected by the mirror 46 and by the surfaces of the blades 86 and 88, has the same spectral composition.

Also in the compartment 24 is a filter 108 which absorbs infrared light so that heating of components on which light is incident subsequently in the apparatus, is reduced.

The compartment 24 also contains a shutter 110 which, in the present embodiment, is a focal plane shutter. The shutter is sealed to the baffle 34, over the apertures 34a and 34c, so that light from the bulb can leave the compartment and pass to the compartment 26 through the apertures 34a and 34c, only when the shutter 110 is open.

The compartment 26 contains a flash light source in the form of a xenon strobe bulb 112. The bulb 112 is located outside the space bounded by an imaginary tubular surface which contacts continously the peripheries of the apertures 34a and 36a in the baffles 34 and 36, respectively. Located at the far side of the just-mentioned space bounded by the tubular surface, is a mirror 114. The mirror 114 is moutned on the rod 116 of a piston and cylinder device 118. The piston and cylinder device 118 serves to move the mirror into and out of the just-mentioned tubular space (i.e. parallel to the y axis), it being shown in the out position in FIG. 1. The mirror 114 is disposed at 45° to the z axis so that it reflects light from the strobe bulb 112 along the z axis, i.e. along the just-mentioned tubular space through successive apertures 36a, 38a and 40a.

In the compartment 28 there are a plurality, in the present example, ten, of filters 120 to 138. The filters 120 to 138 are carried by rods 120r to 138r of piston and cylinder units 120c to 138c. Operation of the piston and cylinder units 120c to 138c serves to move the respective filters 120 to 138 along the y axis into and out of positions in which they intercept light from the lamp 41 passing from apertures 36a, 36c to apertures 38a, 38c. When in the inoperative positions, illustrated in FIG. 1, the filters are disposed entirely out of intercepting relationship with light passing directly from apertures 36a, 36c to apertures 38a, 38c.

The filters 120 to 128 include a plurality of gray filters of different densities, so that, by the insertion of one or more of them, the intensity of the light passing to the film can be selectively attenuated to any one of a plurality of values. The filters 120 to 128 also include a plurality of filters so constructed as to pass only selected bands of wavelengths of the light incident on them. Thus, by appropriate selection and insertion of filters, light of a predetermined intensity and band of wavelengths may be caused to be incident on the film. Of course, with an appropriate filter or filters, a very narrow band of wavelengths, or even a 'line', may be allowed to pass to the film.

Schematically represented in compartment 30 in FIG. 2, are means 140 for receiving and holding a filter different to those in the back of filters in the compartment 28. The filter inserted at the means 140 might be one used infrequently or uniquely for a special test.

Figure 6:
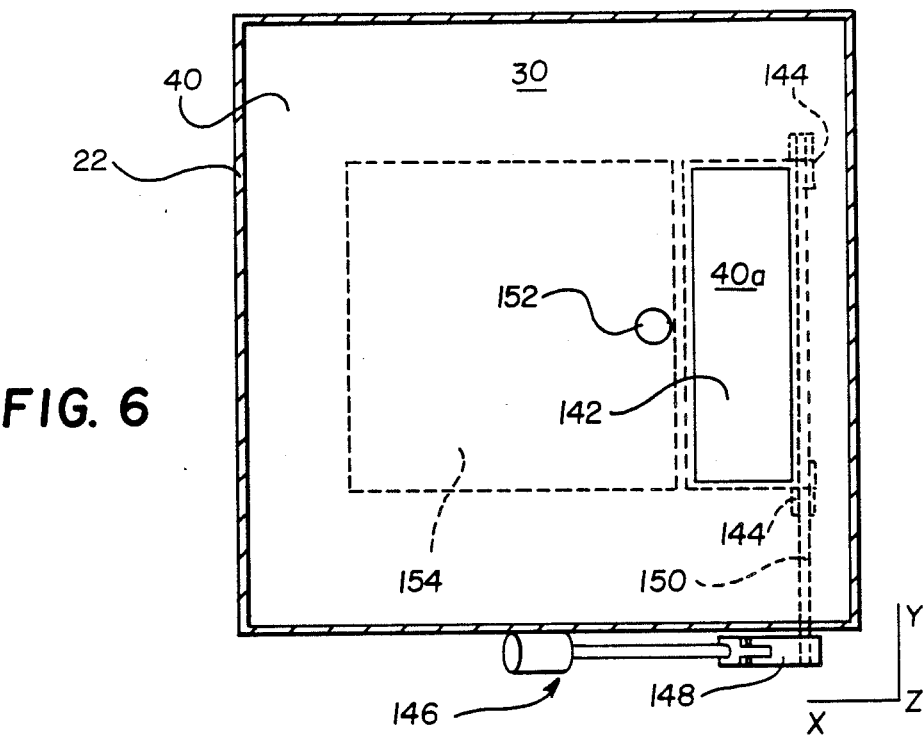
FIG. 6 is a view in the direction 6—6 indicated in FIG. 1.

The baffle 40 is visible in FIG. 6. The aperture 40a is closeable and openable by an opaque door 142 which is attached to the baffle 40 by hinges 144. The door is openable and closeable by a piston and cylinder unit 146 operating on a lever 148 attached radially of a shaft 150 which is parallel to the y axis and which extends through the hinges 144 and which is secured to the door 142.

As can be seen in FIG. 6, the circular aperture 42c is located close adjacent the aperture 40a and is much smaller. The circular aperture 42c allows passage of light from the compartment 30 to a spectroradiometer 154 located in the compartment 32. The only access for light to the interior of the spectroradiometer 154 is through the aperture 42c and a tubular shroud 156 leading from the aperture 42c to the spectroradiometer. The spectroradiometer constitutes another component of the illumination source. Upon entering the spectroradiometer, light passes through a depolarizer (not illustrated) which consists of two crystal quartz wedges with their fast axes disposed at 45° to one another and with one wedge being twice the thickness of the other. The use of wedges ensures that the depolarizer is achromatic. The ratio of the thicknesses and the orientation of the fast axes eliminates any fast axis.

The apertures 34a, 35a and 38a are so sized and disposed that light from the bulb and mirror 46 directly, without any reflection, is incident on all portions of the aperture 40a. Also, the apertures 34a, 36a, 38a and 40a are so sized and disposed that if an eye were substituted for the filament of the bulb 42 and it looked along the z axis, it would see: a margin of the baffle 36 entirely encompassing the aperture 36a; a margin of the baffle 38 entirely encompassing the aperture 38a; and a margin of the baffle 40 entirely encompassing the aperture 40a. The apertures 34c, 36c, 38c and 40c are aligned so that the spectroradiometer 154 can 'see' the bulb 42.

Fixedly mounted in an end wall 157 of the compartment 32 is a step wedge 158 of known form for use in exposing photographic film to intensities of light which decrease progressively as the thickness of the wedge increases at each step. As is known, the step wedge is formed of transparent material which is uniformly grey so that its "optical density", that is, its ability to pass light, is directly dependent on its thickness. The step wedge is so disposed in the end wall of the compartment 32 that every portion of it can 'see' the filament of the bulb 42.

A pressure plate 160 is located at the side of the step wedge remote from the light generator 44 and is at least coextensive in area therewith. The pressure plate 160 is carried by the rods 162 of piston cylinder units 164 which serve to move the pressure plate 160 along the z axis with the plane of its surface facing the step wedge 158 parallel to the step wedge 158.

As may be seen in FIG. 1, film strip for exposure is contained in a chamber 166 and enters the housing 22 through a light-tight port 168. After exposure, film is lead out of the housing 22, through light-tight port 170, into take-up chamber 172. Film is drawn into the take-up chamber 172 by a motor 173.

The spectroradiometer 154 is of a form well-known to those skilled in the art and will not be described in detail herein. The spectroradiometer 154 takes light which has passed through the aperture 152 and the shroud 156 and images a spectrum from 380 to 740 nm onto a linear array of, in the present embodiment, thirty-two, photodiodes. Thus, the spectroradiometer 154 provides thirty-two signals indicative of the intensity of light in each of a thirty-two, uniform width bands together extending from 380 to 740 nm. The value of the color temperature and illuminance for thirty-two wavelengths nominally at the middle of each of the thirty-two bands, are derived from the thirty-two signals from the sensors. The spectral values are multiplied by the X, Y and Z tristimulus values and from these the color coordinates, luminosity of radiant power and color temperature can be derived.

Figure 8:
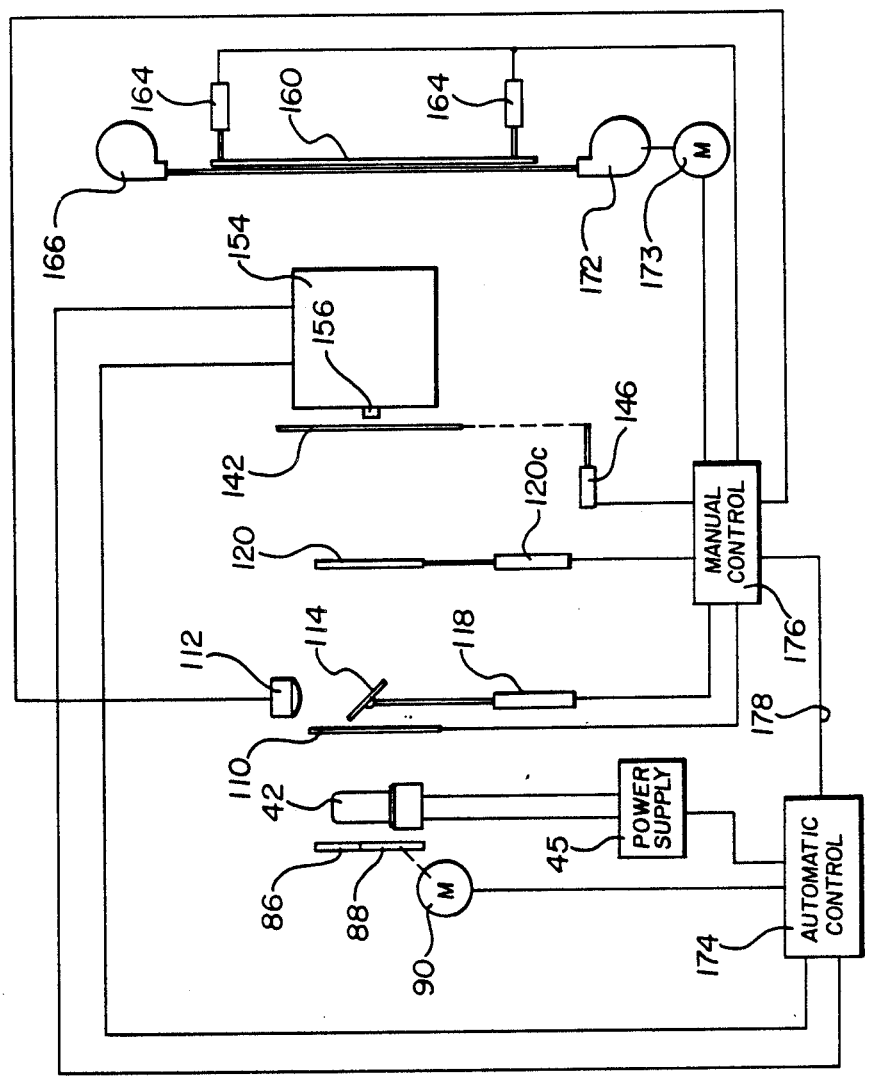
FIG. 8 is a diagram of a control circuit for the apparatus illustrated in preceding Figures.

FIG. 8 is a diagram of the control system for the stepping motor 90; the power supply 45; the piston cylinder 118 for positioning the mirror 114; the piston cylinders 120c to 138c (of which only a representative piston cylinder 120c is illustrated) for positioning the filters 120 to 138; the piston cylinder 146 for positioning the door 142; the piston cylinders 164 for positioning the platen 160; and the motor 173 for drawing film into the take-up chamber 172. The control system includes an automatic control 174 for controlling the stepping motor 90 and the power supply 45, and a manually controlled control 176.

The entire apparatus is maintained at a stable temperature by means, not shown in the drawings and not to be further described herein, well known to those skilled in the art.

In operation, film to be exposed is loaded in the chamber 166, and lead through the port 168, and between the pressure plate 160 and the step wedge 158, to the port 170 and thence to the take-up chamber 172. The pressure plate 160 is moved forward by the piston cylinder units 164 so that the film is pressed against the wedge 158. At this time, the door 142 is closed and the bulb 42 has been on for some time so that the system is stabilizing. The shutter 110 is open so that light can be incident in the spectroradiometer 154. All of the filters 120 to 138 are in out, non-effective positions (i.e. as illustrated in FIG. 1). The mirror 114 is also in its out, non-effective position (i.e. as illustrated in FIG. 1).

Figure 7:
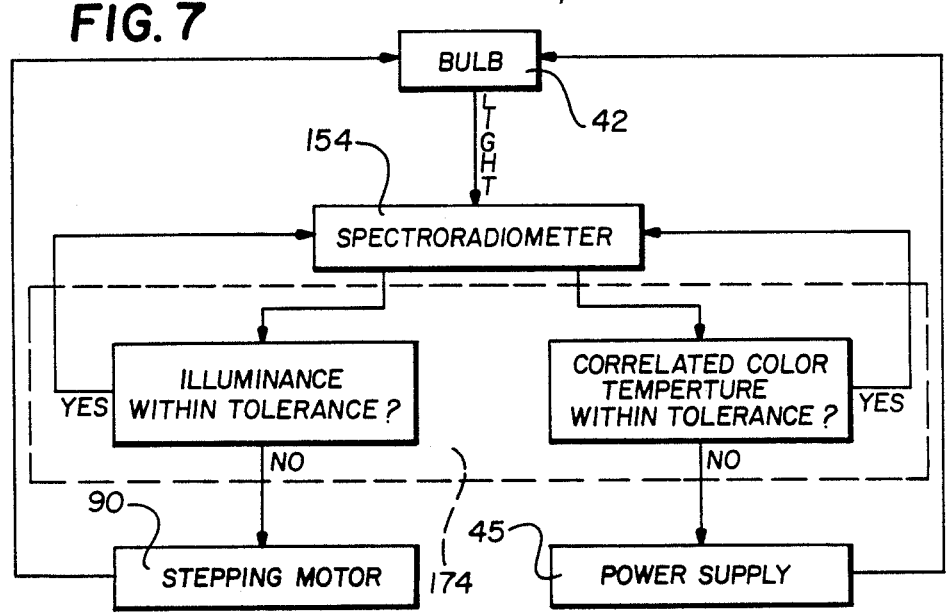
FIG. 7 is a flow chart representing the procedure for maintaining the color temperature and the brightness of the illumination source in the apparatus illustrated in the preceding Figures.

Power is supplied to the bulb 42 by the power supply 45. The output of the power supply is under the control of the automatic control 174 which causes the power applied to the bulb to vary depending on whether the color temperature and illuminance, as measured by the spectroradiometer 154, are within tolerances. FIG. 7 is a flow chart with the bulb 42; the spectroradiometer 154; the automatic control 174; the stepping motor 90; and the power supply 45 being represented. As represented in the flow chart, light from the generator 44 is incident in the spectroradiometer 154. The spectroradiometer generates signals indicative of the illuminance and the correlated color temperature, which are transmitted to the automatic control 174. The automatic control 174 tests the signals to see whether they are within tolerance. The color temperature signal is tested first and if it is not within tolerance it sends a signal to the power supply to bring the color temperature back within tolerance, which is achieved by variation of the power applied to the bulb 42. The illuminance signal is tested when the color temperature signal is within tolerance. If the illuminance signal is out of tolerance, the automatic control signals the stepping motor so as to bring the signal back within tolerance by variation of the spacing between the shutter blades 86 and 88. Whenever the shutter 110 is open, the automatic control 174 is operating to maintain the color temperature and the illuminance of the bulb 42 within tolerance. Whenever the illuminance and color temperature of the bulb are within tolerance, an enabling signal is sent by the automatic control 174 to the manually controlled control 1176, through lead 178.

The manually controlled control 176 controls all those features which are not under the automatic control 174 and are related to actually exposing a strip of film as distinct from the maintenance of illuminance and color temperature of the bulb 42.

Film has been loaded as described above, the door 142 being in a closed condition for the loading. A program for the exposures of the film is entered into the manually controlled control 176. The program might include exposure with none of the filters 120 to 138 in the light path; successive exposures with selected filters 120 to 138 in the light path; and an exposure with the exposing light being derived from the xenon tube 112. The film is advanced by the motor 173 between successive exposures, with sufficient film being advanced after each exposure that exposed film is entirely within the take-up chamber when the next exposure is made. When the operation is initiated, the control 176 causes the shutter 110 to close. The door 142 is then opened by a signal from the control 176 to the piston cylinder 146. The shutter 110 is then caused to open for a predetermined brief period, after which it again closes. The control then causes the piston cylinders 164 to withdraw the platen 160 and then to energize the motor 173 so that the film is advanced. The control 176 then causes the piston cylinders 164 to move the platen 160 forward so that the film is again pressed against the step wedge 158. The control then causes a selected filter 120 to 138 to be moved, by its associated piston cylinder 120c to 138c, into the path of light. The shutter 110 is again opened and closed by the control 176. The operation for advancing the film is repeated and the previously used filter is withdrawn and another filter is inserted in the light path. This procedure is repeated until all the exposures with the exposing light being derived from the generator 44, have been completed. With bulb-derived-light exposures completed, the control causes the piston cylinder 118 to move the mirror 114 into its operative position. The door 142 is then closed so that the strobe 112 can be flashed several times, under the control of the control 176, so that a stable output of the strobe is achieved. When stability of the output of the strobe is achieved, flashing of the strobe is stopped and the control 176 causes the piston cylinder unit 146 to open the door 142. The strobe is again flashed and the film is advanced, as described above, except that the door 142 need not be closed. Subsequent exposures with the strobe providing the light and with a different selected filter in the light path for each exposure, are then effected, as programmed into the control 176.

The five degrees of freedom and positioning of the filament of the bulb, were described above. These degrees were x, y, z, $\theta x$ and $\theta y$. They are adjusted when the apparatus is being set up and they are adjusted with the intent of gaining uniform illumination on the wedge 158. It has been observed that the $\theta x$ adjustment affects uniformity of illumination along the y axis and the $\theta y$ adjustment affects uniformity of illumination along the x axis.

It has been found that, in one embodiment of the present invention generally as described above, the modulator 48 can effect a 40% variation in the illuminance on the wedge. It will have been understood that the modulator serves to vignette the image of the filament formed on the filament of the bulb 42 by the mirror 46. It will have been understood that the modulator 48 is sued to maintain constant the intensity of the light emitted by the light generator and it is not used to vary the intensity of the light emitted by the generator for the purpose of creating different exposures of the photographic film. The filters 124 to 138 serve the purpose of creating different intensities of light incident on the step wedge, by varying the amount of light passed from the constant intensity light generator.

The fact that a margin of each baffle 36, 38 and 40 around the aperture 36a, 38a and 40a in the baffle can be 'seen' by the bulb filament through the aperture in the preceding baffle has been found to improve uniformity of illumination and color temperature.

As can be seen in the drawings, the modulator shutter blades 86 and 88 are, in the embodiment illustrated and described above, rectangular. Advantages may be achieved in other embodiments if the facing edges of the two blades are given a non-rectilinear, for example, saw-tooth, form.

In the embodiment particularly described above, the shutter blades are formed of the same material as the reflective surface of the mirror. In other embodiments, the surface of the blades facing the bulb may be made totally absorptive of the light incident on them. In this way also, the color temperature of the light issuing from the generator, i.e. the bulb, mirror and modulator, will not be affected by the condition of the modulator, e.g. the opening of the shutter blades.

In the embodiment described above, the light modulator is of the variable aperture type, and, particularly, is in the form of two shutter blades which are selectively positioned relative to one another. It is to be understood that the modulator may take other forms. For example, the modulator could include crossed polarizers with the inclination between their planes of polarization being variable to vary the modulation of light passed by them; pass wedges with increasing density across the optical, i.e. the z, axis; a two-axis venetian blind; or any other type of optical switch or shutter which, when actuated to vary modulation, does not affect color temperature or uniformity of illumination.

The invention has been described in detail with particular reference to a presently preferred embodiment, but it will be understood that variations and modifications can be effected within the spirit and scope of the invention.

What is claimed is:

1. A variable brightness light generator, including:
   a spherical mirror;
   a lamp located at the center of the spherical form of said mirror; and
   a modulator located between the lamp and the mirror for modulating the brightness of the image of the bulb on the bulb.

2. A variable brightness light generator as claimed in claim 1, wherein: said modulator is of the variable aperture type.

3. A variable brightness light generator as claimed in claim 3, wherein the variable aperture modulator includes two shutters movable towards and away from one another.

4. A variable brightness light generator as claimed in claim 3, wherein: said two shutters are formed of the same material as the reflective surface of the mirror whereby light whether reflected by the mirror or the shutters has the same spectral composition.

5. A variable brightness light generator as claimed in claim 4, wherein: the material of the shutters and of the reflective surface of the mirror is aluminum and the surfaces of the shutters are diffusely reflective.

6. A variable brightness light generator as claimed in claim 3, wherein: said modulator further includes a stepping motor for moving one blade in its plane, and a lever acting between the two blades to transmit motion from said one blade to the other blade but with the motion of said other blade being opposite in direction to that of said one blade.

7. A variable brightness light generator as claimed in any one of claims 1 to 6, wherein: said light bulb is of of the low voltage tungsten halogen type, whereby the filament may be small.

* * * * *